(12) United States Patent
Ebisuzaki et al.

(10) Patent No.: US 10,468,724 B2
(45) Date of Patent: Nov. 5, 2019

(54) ALL-SOLID-STATE BATTERY

(71) Applicant: Toyota Jidosha Kabushiki Kaisha, Toyota-shi, Aichi-ken (JP)

(72) Inventors: Hideyo Ebisuzaki, Toyota (JP); Masashi Kodama, Hadano (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 355 days.

(21) Appl. No.: 15/285,518

(22) Filed: Oct. 5, 2016

(65) Prior Publication Data

US 2017/0098864 A1    Apr. 6, 2017

(30) Foreign Application Priority Data

Oct. 5, 2015  (JP) .................. 2015-197468

(51) Int. Cl.
*H01M 10/00* (2006.01)
*H01M 10/0585* (2010.01)
*H01M 10/0525* (2010.01)
*H01M 10/0562* (2010.01)

(52) U.S. Cl.
CPC ... *H01M 10/0585* (2013.01); *H01M 10/0525* (2013.01); *H01M 10/0562* (2013.01); *H01M 2300/0068* (2013.01)

(58) Field of Classification Search
CPC ......... H01M 10/0585; H01M 10/0562; H01M 10/0525; H01M 2300/0068; C01B 17/20; C01B 17/22
See application file for complete search history.

(56) References Cited

U.S. PATENT DOCUMENTS

| 2008/0274411 | A1  | 11/2008 | Nakajima et al. | |
| 2009/0087751 | A1* | 4/2009  | Kondo    | H01M 10/0562 |
| | | | | 429/309 |
| 2009/0142669 | A1  | 6/2009  | Shinohara et al. | |
| 2012/0237834 | A1* | 9/2012  | Ogasa   | H01M 10/0562 |
| | | | | 429/320 |
| 2013/0295464 | A1* | 11/2013 | Yanagi  | H01M 4/5815 |
| | | | | 429/231.9 |
| 2014/0193689 | A1  | 7/2014  | Takami et al. | |
| 2014/0272554 | A1* | 9/2014  | Yanagi  | H01M 10/0562 |
| | | | | 429/189 |

FOREIGN PATENT DOCUMENTS

| CN | 101425604 A  | 5/2009 |
| JP | 2007-273436 A | 10/2007 |

(Continued)

*Primary Examiner* — Nicholas P D'Aniello
(74) *Attorney, Agent, or Firm* — Dinsmore & Shohl LLP

(57) ABSTRACT

An all-solid-state battery able to inhibit internal short-circuiting that occurs in the case of a rise in battery temperature during improper use, etc., of the all-solid-state battery is provided. The all-solid-state battery (100) has a positive electrode active material layer (10), a solid electrolyte layer (20) and a negative electrode active material layer (30) in that order, and the solid electrolyte layer (20) has solid electrolyte particles (14) and additive particles (22). The additive particles have a melting point of 700° C. or higher and are electrochemically inert. The ratio of the median diameter (D50) of the additive particles to the thickness of the solid electrolyte layer (20) is 0.4 to 0.8.

12 Claims, 2 Drawing Sheets

(56) References Cited

FOREIGN PATENT DOCUMENTS

| JP | 2009064645 A | 3/2009 |
| JP | 2009158476 A | 7/2009 |
| JP | 2015076316 A | 4/2015 |
| WO | 2005112180 A1 | 11/2005 |
| WO | 2013140565 A1 | 9/2013 |

* cited by examiner

ALL-SOLID-STATE BATTERY

CROSS-REFERENCE TO RELATED APPLICATION

This application claims priority to Japanese Patent Application No. 2015-197468 filed on Oct. 5, 2015, the entire contents of which are hereby incorporated by reference into the present application.

TECHNICAL FIELD

The present disclosure relates to an all-solid-state battery that inhibits internal short-circuiting caused by improper use etc.

BACKGROUND ART

Among the various types of batteries available at present, lithium ion batteries are attracting attention from the viewpoint of their high energy density. In particular, all-solid-state batteries, in which the electrolytic solution has been replaced with a solid electrolyte, are attracting attention among these batteries. This is because, differing from secondary batteries using an electrolytic solution, since all-solid-state batteries do not use an electrolytic solution, there is no degradation of the electrolytic solution caused by overcharging and these batteries have high cycling characteristics and high energy density.

When an all-solid-state battery is used improperly, such as in the case of causing an external short-circuit, overcharging, heating or allowing a metal fragment or other foreign object to enter the battery during battery production, the all-solid-state battery may undergo an internal short-circuit. Therefore, research is being conducted on a technology for preventing internal short-circuiting during improper use etc., of an all-solid-state battery.

Incidentally, Patent Documents 1 and 2 disclose a technology for improving ion conductivity by mixing α-alumina having an average particle diameter of 10 μm or less with a sulfide solid electrolyte or sulfide glass solid electrolyte. In addition, Patent Document 3 discloses a solid electrolyte material for improving ion conductivity that is obtained by mixing α-alumina having an average particle diameter of 1 μm or less with a lithium halide.

PRIOR ART DOCUMENTS

Patent Documents

[Patent Document 1] Japanese Unexamined Patent Publication No. 2009-64645
[Patent Document 2] Japanese Unexamined Patent Publication No. 2009-158476
[Patent Document 3] Japanese Unexamined Patent Publication No. 2015-76316

SUMMARY

Problems to be Solved

The inventors of the present disclosure found the problem that an internal short-circuiting occurs due to contact between the positive electrode active material layer and negative electrode active material layer, which is caused by softening and collapse of the solid electrolyte layer when a battery temperature has been raised by improper use, etc., of an all-solid-state battery.

Thus, an object of the present disclosure is to provide an all-solid-state battery that is able to prevent such problems.

Means for Solving the Problems

Means for solving the problems of the present disclosure are as indicated below.

An all-solid-state battery having a positive electrode active material layer, a solid electrolyte layer and a negative electrode active material layer in that order is provided. The solid electrolyte layer has solid electrolyte particles and additive particles that have a melting point of 700° C. or higher and are electrochemically inert, and the ratio of the median diameter (D50) of the additive particles to the thickness of the solid electrolyte layer is 0.4 to 0.8.

In embodiments, the median diameter (D50) of the additive particles is 20 m to 40 μm and the additive particles are metal oxide particles illustratively including, without illustration, $Al_2O_3$ particles, $SiO_2$ particles or a combination thereof.

In other embodiments, the additive particles are LiF particles.

The content of the additive particles in the solid electrolyte layer is 3% by weight to 10% by weight. The positive electrode active material layer and/or the negative electrode active material layer do not have additive particles and the solid electrolyte particles are sulfide solid electrolyte particles.

In embodiments, the solid electrolyte particles are vitreous.

Effects

According to the present disclosure, an all-solid-state battery can be provided that is able to inhibit internal short-circuiting that occurs when the battery temperature increases during improper use etc., of the all-solid-state battery.

DETAILED DESCRIPTION

The following provides a detailed description of embodiments of the present disclosure. Furthermore, the present disclosure is not limited to the following embodiments, but rather can be modified in various ways within the scope of the gist thereof.

The all-solid-state battery of the present disclosure is an all-solid-state battery having a positive electrode active material layer, a solid electrolyte layer and a negative electrode active material layer in that order, wherein the solid electrolyte layer has solid electrolyte particles and additive particles that have a melting point of 700° C. or higher and are electrochemically inert, and the ratio of the median diameter (D50) of the additive particles to the thickness of the solid electrolyte layer is 0.4 to 0.8.

Figure 1:
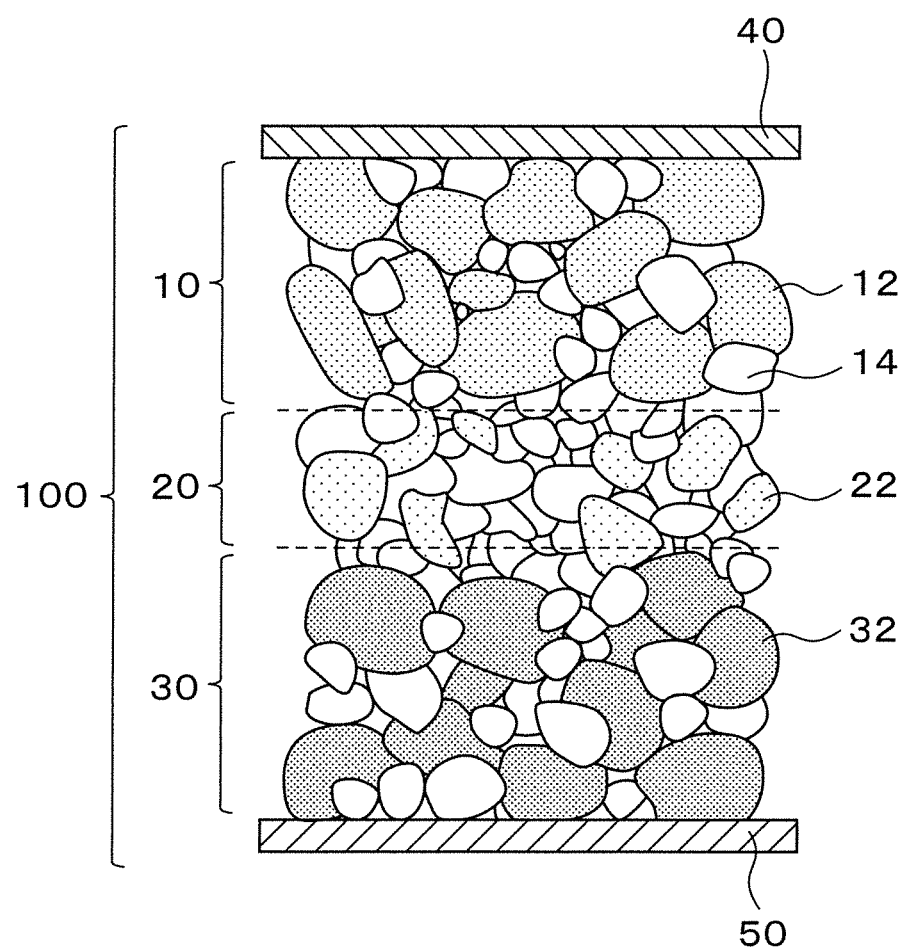
FIG. 1 is a schematic representation of an example of a configuration of an all-solid-state battery according to one or more embodiments of the present disclosure.

FIG. 1 is a schematic representation of an example of the configuration of an all-solid-state battery based on an embodiment of the present disclosure. As shown in FIG. 1, an all-solid-state battery (100) based on embodiments of the present disclosure has a positive electrode current collector (40), a positive electrode active material layer (10), a solid electrolyte layer (20), a negative electrode active material layer (30) and a negative electrode current collector (50). The positive electrode active material layer (10) has a positive electrode active material (12) and solid electrolyte particles (14). The solid electrolyte layer (20) has solid electrolyte particles (14) and additive particles (22). The negative electrode active material layer has a negative electrode active material (32) and solid electrolyte particles (14). Incidentally, FIG. 1 merely indicates one example of the configuration of the all-solid-state battery of the present disclosure.

Although not limited in principle, the operating principle of the present disclosure is thought to be as indicated below.

When the all-solid-state battery is improperly used, e.g., when causing an external short-circuit, overcharging, heating or allowing a metal fragment or other foreign object to enter the battery during battery production, the all-solid-state battery may generate heat.

The solid electrolyte particles used in all-solid-state batteries have a high melting point, and are thought to not melt easily even when the all-solid-state battery generates heat due to improper use, etc., of the battery. However, even when the exothermic temperature is lower than the actual melting point of the solid electrolyte particles, the solid electrolyte layer may soften and collapse, thereby causing the positive electrode active material layer and negative electrode active material layer to make contact resulting in the occurrence of an internal short-circuit. Although the cause of this is unclear, it is thought to be related to the application of high pressure to the all-solid-state battery.

As a means for preventing internal short-circuiting in an all-solid-state battery when the battery has been used improperly, additive particles are added to the solid electrolyte layer so that contact between the positive electrode active material layer and negative electrode active material layer can be prevented even when the solid electrolyte layer has softened. The additive particles having a melting point higher than the exothermic temperature of the battery when the battery has been internally short-circuited, are electrochemically stable, and have a large particle diameter.

<All-Solid-State Battery>

The all-solid-state battery of the present disclosure has a positive electrode active material layer, a solid electrolyte layer, and a negative electrode active material layer in that order, and the solid electrolyte layer has additive particles.

<Solid Electrolyte Layer>

The solid electrolyte layer of the present disclosure has a solid electrolyte and additive particles.

1. Solid Electrolyte Particles

There are no particular limitations on the solid electrolyte particles provided it is solid electrolyte particles used as a solid electrolyte in an all-solid-state battery. Examples thereof include oxidizing amorphous solid electrolyte particles such as $Li_2O-B_2O_3-P_2O_5$ or oxide solid electrolyte particles such as $Li_2O-SiO_2$, sulfide solid electrolyte particles such as $Li_2S-SiS_2$, $LiI-Li_2S-SiS_2$, $LiI-Li_2S-P_2S_5$, $LiI-Li_2S-P_2O_5$, $LiI-Li_3PO_4-P_2S_5$ or $Li_2S-P_2S_5$, and crystalline oxides/nitrides such as LiI, $Li_3N$, $Li_5La_3Ta_2O_{12}$, $Li_7La_3Zr_2O_{12}$, $Li_6BaLa_2Ta_2O_{12}$, $Li_3PO_{(4-3/2w)}N_{w(w<1)}$ or $Li_{3.6}Si_{0.6}P_{0.4}O_4$.

Furthermore, the all-solid-state battery of the present disclosure demonstrates a large effect if the solid electrolyte layer uses sulfide solid electrolyte particles, and particularly vitreous sulfide solid electrolyte particles. This is because these solid electrolyte particles are easily softened by heat generated by the battery.

2. Additive Particles

Additive particles are contained in the solid electrolyte layer of the present disclosure. In addition, the additive particles have a melting point of 700° C. or higher and are electrochemically inert.

(1) Melting Point of Additive Particles

The additive particles are required not to melt at the exothermic temperature of the all-solid-state battery during improper use thereof in order to prevent contact between the positive electrode active material layer and negative electrode active material layer when the all-solid-state battery has been heated or has generated heat. The exothermic temperature in the case the all-solid-state battery has generated heat due to improper use thereof is thought to be a maximum of about 600° C. Consequently, the melting point of the additive particles possessed by the all-solid-state battery of the present disclosure is 700° C. or higher.

In embodiments, the melting point of the additive particles may be 800° C. or higher, 900° C. or higher, 1000° C. or higher, 1500° C. or higher or 2000° C. or higher.

(2) Electrochemically Inert

The additive particles which the all-solid-state battery of the present disclosure has are electrochemically inert. Here, "electrochemically inert" means that the additive particles do not participate in battery reactions during charging and discharging when the all-solid-state battery is used normally.

(3) Type of Additive Particles

Although there are no particular limitations on the type of additive particles provided they have a melting point of 700° C. or higher and are electrochemically inert, preferable examples thereof include metal oxide particles such as $Al_2O_3$ particles or $SiO_2$ particles, LiF particles and combinations thereof. This is because these particles have a particularly high melting point and are electrochemically inert. Furthermore, since these additive particles have low lithium ion conductivity, they are preferably not contained in the positive electrode active material layer and/or negative electrode active material layer.

(4) Median Diameter (D50) of Additive Particles

The ratio of the median diameter (D50) of the additive particles to the thickness of the solid electrolyte layer is 0.4 to 0.8. If the ratio of the median diameter (D50) of the additive particles to the thickness of the solid electrolyte layer is excessively small, contact between the positive electrode active material layer and negative electrode active material layer cannot be inhibited since the additive particles flow with the softened solid electrolyte layer when the all-solid-state battery has been heated or has generated heat. Conversely, if the ratio of the median diameter (D50) of the additive particles to the thickness of the solid electrolyte layer is excessively large, lithium ion conduction paths of the solid electrolyte layer are obstructed by the additive particles due to their low lithium ion conductivity, thereby increasing the internal resistance of the all-solid-state battery and causing it to lose practicality as a battery.

The ratio of the median diameter (D50) of the additive particles to the thickness of the solid electrolyte layer may be 0.5 or more or 0.6 or more and 0.7 or less.

In addition, the median diameter (D50) of the additive particles is preferably 20 μm to 40 μm. This is because, if the median diameter (D50) of the additive particles is within this range, lithium ion conductivity of the solid electrolyte layer is thought to be able to be maintained while inhibiting contact between the positive electrode active material layer and negative electrode active material layer.

The particle diameter of the additive particles may be 23 μm or more, 25 μm or more or 27 μm or more and 37 μm or less, 35 μm or less, 33 μm or less or 30 μm or less.

Furthermore, the median diameter (D50) of the additive particles of the present disclosure was calculated as the particle diameter such that the number of particles having a particle diameter on the large side of a certain particle diameter and the number of particles having a particle diameter on the small side of a certain particle diameter are equal when the particle size distribution of the additive particles is obtained using the LA-920 Laser Diffraction/Scattering Particle Size Distribution Analyzer (Horiba, Ltd.) and the particles are divided into those having a particle diameter on the large side and those having a particle diameter on the small side of that certain particle diameter.

(5) Content of Additive Particles in Solid Electrolyte Layer

Furthermore, although there are no particular limitations on the content of the additive particles in the solid electrolyte layer, it is preferably 3% by weight to 10% by weight. If the content of additive particles is excessively low, short-circuiting between the positive electrode active material layer and negative electrode active material layer cannot be adequately inhibited when the all-solid-state battery has been heated or has generated heat, while conversely, if the content is excessively high, lithium ion conduction paths of the solid electrolyte layer are obstructed by the additive particles due to their low lithium ion conductivity, thereby resulting in an increase in internal resistance of the all-solid-state battery.

The content of the additive particles in the solid electrolyte layer may be 4% by weight or more, 5% by weight or more or 6% by weight or more and 9% by weight or less, 8% by weight or less or 7% by weight or less.

<Positive Electrode Active Material Layer>

The positive electrode active material layer of the all-solid-state battery of the present disclosure has a positive electrode active material, and optionally solid electrolyte particles, a conductive assistant and a binder.

1. Positive Electrode Active Material

There are no particular limitations on the positive electrode active material provided it is a material used as a positive electrode active material of lithium secondary batteries. Examples thereof include lithium cobalt oxide, lithium nickel oxide, lithium nickel-cobalt-manganese oxide, lithium manganese oxide, xenogenic element-substituted Li—Mn spinel, lithium titanate, lithium metal phosphates having a composition represented by $LiMPO_4$ (wherein, M represents one or more types of elements selected from Fe, Mn, Co and Ni), and combinations thereof.

2. Solid Electrolyte Particles

Solid electrolyte particles described in the previous section on the solid electrolyte layer can be used for the solid electrolyte.

3. Conductive Assistant

Examples of conductive assistants include carbon materials such as vapor-grown carbon fibers (VGCF), acetylene black, Ketjen black, carbon nanotubes (CNT) or carbon nanofibers (CNF), metals such as nickel, aluminum or stainless steel, and combinations thereof.

4. Binder

Examples of binders include, but are not limited to, polymer resins such as polyvinylidene fluoride (PVdF), polytetrafluoroethylene (PTFE), polyimide (PI), polyamide (PA), polyamide-imide (PAI), butadiene rubber (BR), styrene butadiene rubber (SBR), nitrile butadiene rubber (NBR) or styrene-ethylene-butylene-styrene block copolymer (SEBS), carboxymethyl cellulose (CMC) and combinations thereof. Preferable examples of binders from the viewpoint of high-temperature durability include polymers such as polyimide, polyamide, polyamide-imide, polyacrylic or carboxymethyl cellulose, and combinations thereof.

<Negative Electrode Active Material Layer>

The negative electrode active material layer of the all-solid-state battery of the present disclosure has a negative electrode active material and optionally solid electrolyte particles, a conductive assistant and a binder.

1. Negative Electrode Active Material

There are no particular limitations on the negative electrode active material used in the negative electrode active material layer provided it is able to occlude and release lithium ions. Specific examples of negative electrode active materials include metals such as Li, Sn, Si or In, alloys of Li and Ti, Mg or Al, carbon materials such as hard carbon, soft carbon or graphite, and combinations thereof.

2. Solid electrolyte particles, Conductive Assistant and Binder

The same solid electrolyte particles described in the aforementioned section on the solid electrolyte layer can be used for the solid electrolyte. In addition, the same conductive assistants and binders described in the aforementioned section on the positive electrode active material layer can be used for the conductive assistant and binder.

EXAMPLES

All-solid-state batteries of Examples 1 to 5 and Comparative Examples 1 to 4 were fabricated according to the methods described below, the all-solid-state batteries of Examples 1 to 5 and Comparative Examples 1 and 2 were evaluated for the presence or absence of internal short-circuiting during battery heating as determined according to a heating test, and the all-solid-state batteries of Examples 1 to 3 and Comparative Examples 2 to 4 were measured for the value of direct current resistance.

Fabrication of All-Solid-State Batteries of Examples 1 to 5 and Comparative Examples 1 to 4

1. Fabrication of Positive Electrode Active Material Layer

Lithium nickel-cobalt-manganese oxide as a positive electrode active material, crystalline sulfide solid electrolyte ($LiI—Li_2S—P_2S_5$) as solid electrolyte particles, PVdF as a binder and vapor grown carbon fibers (VGCF) as a conductive assistant were dispersed in heptane as a dispersion medium and mixed using an ultrasonic homogenizer (UH-50, SMT Corp.) to fabricate a slurry for the positive electrode active material layer. Incidentally, in fabricating the slurry for the positive electrode active material layer, the solid content of the slurry was 50% by weight, the ratio of the positive electrode active material to the solid electrolyte particles was 75:25 and the amount of binder was 1.5 parts by weight to 100 parts by weight of the positive electrode active material.

The fabricated slurry for the positive electrode active material layer was coated onto aluminum foil by doctor blade coating followed by drying to fabricate the positive electrode active material layer.

2. Fabrication of Negative Electrode Active Material Layer

Natural graphite as a negative electrode active material, crystalline sulfide solid electrolyte particles as solid electrolyte particles and PVdF as a binder were dispersed in heptane as a dispersion medium and mixed using ultrasonic homogenizer (UH-50, SMT Corp.) to fabricate a slurry for the negative electrode active material layer. Incidentally, in fabricating the slurry for the negative electrode active material layer, the solid content was 50% by weight, the ratio of the negative electrode active material to the solid electrolyte particles was 58:42, and the amount of binder was 1.1 parts by weight to 100 parts by weight of the negative electrode active material.

The fabricated slurry for the negative electrode active material layer was coated onto copper foil by doctor blade coating followed by drying to fabricate the negative electrode active material layer.

3. Fabrication of Solid Electrolyte Layer

Additive particles, sulfide solid electrolyte particles (LiI—Li$_2$S—P$_2$S$_5$) and PVdF as a binder were adjusted to 5% by weight of the additive particles, 90% by weight of the sulfide solid electrolyte particles and 5% by weight of the PVdF followed by dispersing in heptane as a dispersion medium to a solid content of 50% by weight and mixing using an ultrasonic homogenizer (UH-50, SMT Corp.) to prepare a slurry for the solid electrolyte layer.

Incidentally, the types and median diameters (D50) of the additive particles used in each of the examples and comparative examples are as described in the fabrication conditions of the following Table 1. Since additive particles were not used in Comparative Example 1, a dash "-" is indicated for the fabrication conditions relating to Comparative Example 1 in Table 1.

The fabricated slurry for the solid electrolyte layer was coated onto the negative electrode active material layer followed by drying to evaporate the dispersion medium. Incidentally, the thickness of the solid electrolyte layer after drying was adjusted to 50 μm in all examples.

4. Battery Assembly

The positive electrode active material layer, solid electrolyte layer and negative electrode active material layer were laminated and then pressed to fabricate all-solid-state batteries of each of the examples and comparative examples.

<Heating Test>

The fabricated all-solid-state batteries of Examples 1 to 5 and Comparative Examples 1 and 2 were adjusted to a state of charge (SOC) of 100% followed by measuring impedance of the all-solid-state batteries using a Cole-Cole plot while heating on a hot plate to 300° C. Behavior in which a circular arc was no longer observed and the plot converged on the real axis in the Cole-Cole plot was judged to constitute short-circuiting.

<Measurement of Direct Current Resistance>

Values of direct current resistance were measured for the all-solid-state batteries of Examples 1 to 3 and Comparative Examples 2 to 4. Incidentally, all of the all-solid-state batteries used to measure direct current resistance were used prior to carrying out the heating test.

<Results>

Fabrication conditions of the fabricated all-solid-state batteries and the results of the heating test and measurement of direct current resistance are shown in Table 1.

TABLE 1

| | Fabrication Conditions | | | Results | |
|---|---|---|---|---|---|
| | Additive Particles | Median Diameter (μm) | Median diameter of additive particles/ thickness of solid electrolyte layer (-) | Occurrence of internal short-circuiting during heating test | Direct current resistance (-) |
| Comp. Ex. 1 | — | — | — | Yes | — |
| Comp. Ex. 2 | Al$_2$O$_3$ | 10 | 0.2 | Yes | 1.00 |
| Example 1 | Al$_2$O$_3$ | 20 | 0.4 | No | 0.97 |
| Example 2 | Al$_2$O$_3$ | 30 | 0.6 | No | 0.99 |
| Example 3 | Al$_2$O$_3$ | 40 | 0.8 | No | 1.05 |
| Comp. Ex. 3 | Al$_2$O$_3$ | 50 | 1.0 | — | 1.20 |
| Comp. Ex. 4 | Al$_2$O$_3$ | 60 | 1.2 | — | 1.27 |
| Example 4 | SiO$_2$ | 30 | 0.6 | No | — |
| Example 5 | LiF | 30 | 0.6 | No | — |

1. Explanation of Table 1

In Table 1, the ratio of "median diameter of additive particles/thickness of solid electrolyte layer" represents the ratio of the median diameter (D50) of the additive particles to the thickness of the solid electrolyte layer. In addition, the value of direct current resistance was calculated on the basis of a value of 1.00 for the direct current resistance of Comparative Example 2, and does not represent a measured value.

2. Heating Test

Internal short-circuiting as a result of subjecting to the heating test occurred in the all-solid-state battery of Comparative Example 1 in which additive particles were not used. In contrast, there was no occurrence of internal short-circuiting attributable to the heating test in the all-solid-state batteries of Examples 1 to 3 in which Al$_2$O$_3$ was used for the additive particles. On the basis thereof, the addition of additive particles to the solid electrolyte layer inhibits internal short-circuiting during heating. However, internal short-circuiting attributable to the heating test occurred in the all-solid-state battery of Comparative Example 2 in which the ratio of "median diameter of additive particles/thickness of solid electrolyte layer" was 0.2 or less. This is thought to be due to the additive particles flowing with the softened solid electrolyte particles. Thus, the additive particles are thought to be required to be of a certain size or larger in order to inhibit internal short-circuiting during heating.

In addition, effects similar to those obtained in the case of Al$_2$O$_3$ were confirmed to be obtained in the case of SiO$_2$ or LiF as well based on the results for Examples 4 and 5.

3. Measurement of Direct Current Resistance Value

The values for direct current resistance of the all-solid-state batteries of Examples 1 to 3 in which the ratio of "median diameter of additive particles/thickness of solid electrolyte layer" was 0.8 or less were 0.97 to 1.05, which approximated the value for direct current resistance of the all-solid-state battery of Comparative Example 2. In contrast, the values of direct current resistance were 1.20 or higher in Comparative Examples 3 and 4 in which the ratio of "median diameter of additive particles/thickness of solid electrolyte layer" was 1.0 or more.

Figure 2:
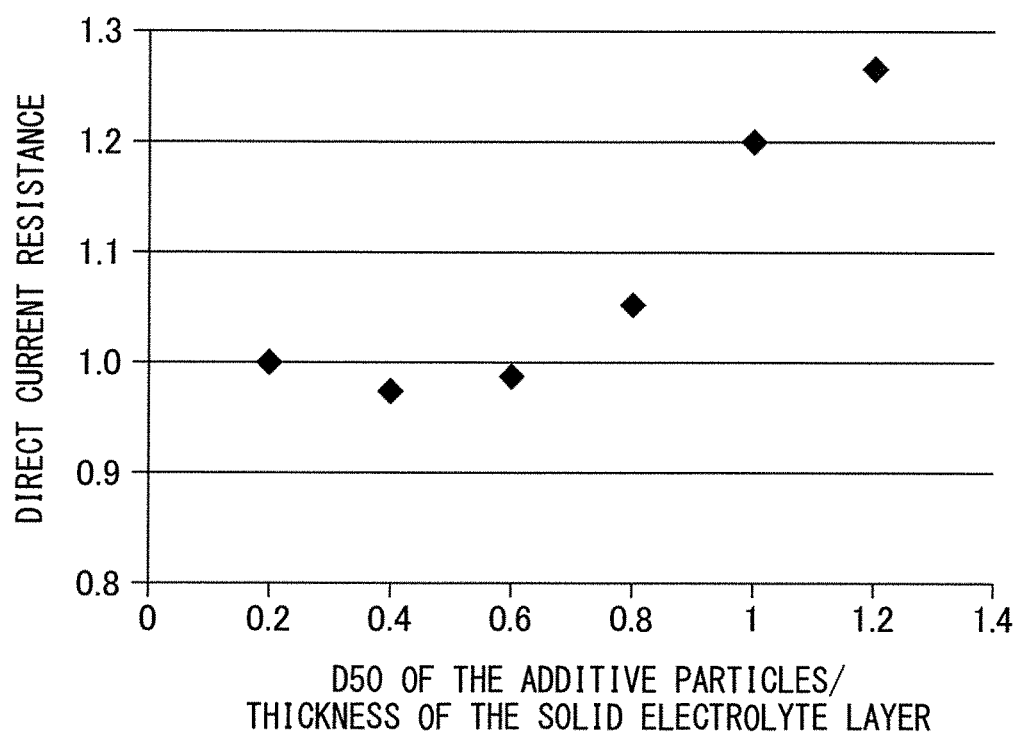
FIG. 2 is a graph indicating the relationship between the ratio of the median diameter (D50) of additive particles to the thickness of a solid electrolyte layer and the value of direct current resistance.

FIG. 2 is a graph indicating the relationship between the ratio of "median diameter of additive particles/thickness of solid electrolyte layer" and the value of direct current resistance. As shown in FIG. 2, although there were no large differences in the values of direct current resistance observed in the case the ratio of "median diameter of additive particles/thickness of solid electrolyte layer" is 0.2 to 0.8, when the ratio of "median diameter of additive particles/thickness of solid electrolyte layer" was 1.0 or more, direct current resistance increased suddenly, reaching a value of 1.2 or more.

This is thought to be due to a decrease in lithium ion conductivity in the solid electrolyte layer as a result of the particle diameter of the additive particles being excessively large with respect to the thickness of the solid electrolyte layer in the case the ratio of "median diameter of additive particles/thickness of solid electrolyte layer" is 1.0 or more. Thus, the ratio of "median diameter of additive particles/thickness of solid electrolyte layer" is thought to be required to be of a certain ratio or less in order to inhibit internal short-circuiting during heating without causing an increase in direct current resistance of the all-solid-state battery.

DESCRIPTION OF THE REFERENCE SYMBOLS

10 Positive electrode active material layer
12 Positive electrode active material
14 Solid electrolyte particles
20 Solid electrolyte layer
22 Additive particles
30 Negative electrode active material layer
32 Negative electrode active material
40 Positive electrode current collector
50 Negative electrode current collector
100 All-solid-state battery

The invention claimed is:

1. An all-solid-state battery comprising: a positive electrode active material layer, a solid electrolyte layer and a negative electrode active material layer in that order; wherein,
the solid electrolyte layer has solid electrolyte particles and additive particles, the additive particles having a melting point of 700° C. or higher and are electrochemically inert,
the solid electrolyte particles are a sulfide solid electrolyte,
a median diameter (D50) of the additive particles is 20 μm to 40 μm, and
a ratio of the median diameter (D50) of the additive particles to a thickness of the solid electrolyte layer is 0.4 to 0.8.

2. The all-solid-state battery according to claim 1, wherein the additive particles are a metal oxide particles.

3. The all-solid-state battery according to claim 2, wherein the additive particles are $Al_2O_3$ particles, $SiO_2$ particles or a combination thereof.

4. The all-solid-state battery according to claim 1, wherein the additive particles are LiF particles.

5. The all-solid-state battery according to claim 1, wherein a content of the additive particles in the solid electrolyte layer is 3% by weight to 10% by weight.

6. The all-solid-state battery according to claim 1, wherein the positive electrode active material layer and/or the negative electrode active material layer do not have additive particles.

7. An all-solid-state battery comprising: a positive electrode active material layer, a solid electrolyte layer and a negative electrode active material layer in that order; wherein,
the solid electrolyte layer has solid electrolytes and additive particles that have a melting point of 700° C. or higher and are electrochemically inert,
the solid electrolytes are vitreous,
a median diameter (D50) of the additive particles is 20 μm to 40 μm, and
a ratio of the median diameter (D50) of the additive particles to a thickness of the solid electrolyte layer is 0.4 to 0.8.

8. The all-solid-state battery according to claim 7, wherein the additive particles are a metal oxide particles.

9. The all-solid-state battery according to claim 8, wherein the additive particles are $Al_2O_3$ particles, $SiO_2$ particles or a combination thereof.

10. The all-solid-state battery according to claim 7, wherein the additive particles are LiF particles.

11. The all-solid-state battery according to claim 7, wherein a content of the additive particles in the solid electrolyte layer is 3% by weight to 10% by weight.

12. The all-solid-state battery according to claim 7, wherein the positive electrode active material layer and/or the negative electrode active material layer do not have additive particles.

* * * * *